United States Patent [19]

Bertan

[11] Patent Number: 5,766,482
[45] Date of Patent: Jun. 16, 1998

[54] CAPTURE, DEGRADATION, AND DESTRUCTION OF SULFUR BEARING COMPOUNDS

[75] Inventor: Paul B. Bertan, Syracuse, N.Y.

[73] Assignee: Paul B. Bertan's Living Trust, Syracuse, N.Y.

[21] Appl. No.: 651,063

[22] Filed: May 21, 1996

[51] Int. Cl.$^6$ .................................................. B01D 15/04
[52] U.S. Cl. .......................... 210/668; 210/679; 210/692; 210/908
[58] Field of Search ........................... 210/679, 690, 210/757, 902, 908, 668, 691, 692; 588/200, 205, 242, 246

[56] References Cited

U.S. PATENT DOCUMENTS

| | | | |
|---|---|---|---|
| 3,728,439 | 4/1973 | Urban | 210/757 |
| 5,021,163 | 6/1991 | Anderson et al. | 210/757 |
| 5,232,484 | 8/1993 | Pignatello | 210/739 |
| 5,336,329 | 8/1994 | Langenmayr | 134/7 |
| 5,354,478 | 10/1994 | Ulman et al. | 210/716 |

FOREIGN PATENT DOCUMENTS

| | | | |
|---|---|---|---|
| 2676368 | 11/1992 | France | 588/200 |

OTHER PUBLICATIONS

Chasanov, et al., "Ion Exchange Resins as Catalysts in the Decomposition of Sarin," 1958, *Journal of Polymer Science*, vol. XXXI, pp. 399–414.

Bertan, "Methods for Capturing and Detoxifying Sulfur Containing Environmental Pollutants Using Solid Substrates," Dec. 1, 1994.

Certificate of Registration, U.S. Copyright Office, Aug. 21, 1995.

*Primary Examiner*—Ivars Cintins
*Attorney, Agent, or Firm*—Nixon, Hargrave, Devans & Doyle LLP

[57] ABSTRACT

A process for capture, degradation, and destruction of a sulfur bearing compound that satisfies the needs for a treatment process that may be used in cartridge, pipeline, and batch, that can handle a large variety of sulfur bearing environmental pollutants, is faster than other methods, and that does not leave dangerous degradation product fractions and residuals in wastewater from the treatment process itself. The present invention is further directed towards a treatment process that is capable of using a safe, dry storable cartridge with small amounts of dry storable mixed resins in a small cartridge, that can fit into a "point of use" pipeline from a contaminated well or point of contaminated "runoff". Dangerous degradation product fractions and residuals in wastewater, are minimized, in order to minimize residual environmental impacts from the treatment process itself. Sulfur bearing compounds are mixed with metals insoluble with the sulfur bearing compounds, reducing agents, and bases. The sulfur bearing compounds to be captured, degraded, and destroyed are reacted with the mixture of metals insoluble with the sulfur bearing compounds, reducing agents, and bases. Fractions are chemically bonded to the mixture, which may be in resin form, utilizing rapid precipitation of the sulfur bearing compound by the insoluble metal in a complex anionic form, in the presence of an anionic reducing agent, which encourages the formation of sulfide anions to aid in precipitation, while continuing rapid alkaline degradation with alkali anions.

18 Claims, 1 Drawing Sheet

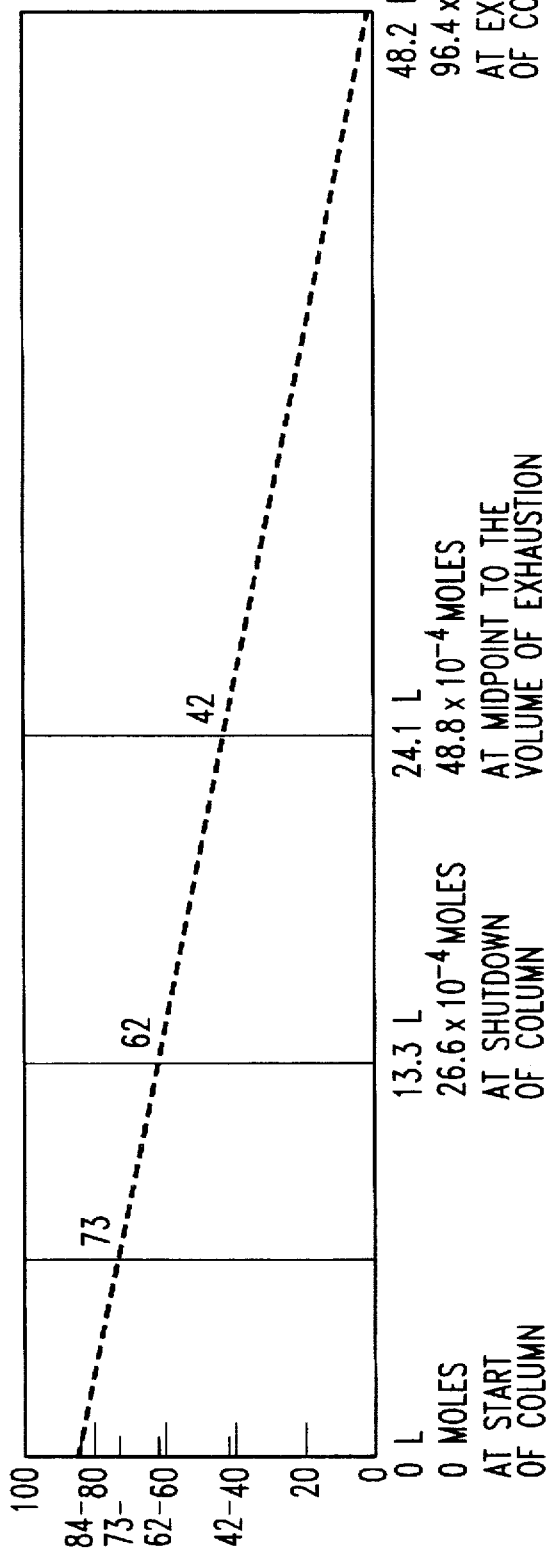

CAPTURE, DEGRADATION, AND DESTRUCTION OF SULFUR BEARING COMPOUNDS

BACKGROUND ART

Toxic chemicals are used in a large variety of processes and applications throughout the world, with thus far, in many instances, toxic residuals left remaining after the use of such chemicals. Pesticides, herbicides, and other toxic chemicals, for example, are applied for agricultural purposes, for killing and/or disabling undesirable crop damaging insects, rodents, plants, and other pestulent life forms, which after application leave toxic residuals, that represent a threat and risk to human life, the food chain, and other biological life forms. Such pesticides, herbicides, and other toxic chemicals are often not selective in the biological life forms that they impact and may often impact kill, damage, or disable life forms other than those that they are intended for, and ultimately affect desired species, the food chain, and human life. Many of these toxins may be responsible for chronic poisoning in homosapiens and other mammals during lifetime exposure and acute poisoning during shorter periods of high dosage. In particular, sulfur bearing chemicals, such as methyl parathion, fenitrothion, fensulfothion, and fenthion, left in the environment after use, represent significant environmental problems and potential health hazards, if not used properly.

Treatment of sulfur bearing environmental pollutants has previously been known. However, previous treatment methods have left dangerous degradation by products in the environment, which in many cases are as dangerous or almost as dangerous as the original pollutants being treated. For example, phenols, thiophosphorates, sulfoxides, and solfones, are often left remaining in the environment after treatment, and in certain cases result in synergistic malevolent effects when combined or in contact with other benign chemicals. Use of alkalis and/or oxidizing agents has been a common form of treatment, with incineration, and the undesirable practice of storage of herbicides, pesticides, and other toxic residuals in land fills, which are often not secure and allow contaminated toxic chemicals to leach into the soil and groundwater, as other forms of treatment.

The problem presents itself to treat sulfur bearing chemicals, wastes, and pollutants in a manner which captures and degrades such sulfur bearing toxics and eliminates any threat to the environment from untreated and/or partially treated toxic chemicals.

The state of the art has been directed towards brute force methods. Previous treatment methods for sulfur bearing environmental pollutants have relied on large wet volume batches. Chemical oxidative methods have been tried, in order to remove sulfur bearing pollutants and pesticide residuals from water, because of the resistance of such pesticides to biodegradation. Carbon adsorption has also been used for finishing. Typically, mixing oxidizing agents such as hypochlorite bleach or acid or alkali solutions in wet batches are used to oxidize such pollutants, which is not totally effective in capturing, degrading, and destroying these undesirable products and by-products, and remaining incompletely treated residuals may be discharged into waterways, groundwater and streams. Oxidizers in general, include: chlorine, potassium permanganate, sodium hypochlorite, calcium hypochlorite, hydrogen peroxide $H_2O_2$, chromic acid, sodium perborate, peroxydisulfate $S_2O_8^{2-}$, air (atmospheric oxygen), and ozone $O_3$, mixed in tanks with the products to be treated. Safety is often a problem in handling and working with such oxidants. Other, but yet ineffective forms of treatment have been tried, including biological oxidation. Parathion wastes, for example, may be characterized as very strong, highly mineralized, and acid in nature. Attempts to treat liquid parathion wastes have included prechlorination, followed by lagooning, neutralization with limestone, adjustment for pH control with soda ash, and activated sludge treatment.

There is a need for a treatment process, that may be used in cartridge, pipeline, and batch, that can handle a large variety of sulfur bearing environmental pollutants, is faster than other methods, and that does not leave dangerous degradation product fractions and residuals in wastewater from the treatment process itself. Such treatment process should be capable of using a safe, dry storable cartridge with small amounts of dry storable mixed resins in a small cartridge that can fit into a "point of use" pipeline from a contaminated well or point of contaminated "run-off". There is also a need to eliminate dangerous degradation product fractions and residuals in wastewater, in order to minimize residual environmental impacts from the treatment process itself.

Different chemical treatment methods have heretofore been known. However, none of the methods satisfies these needs.

U.S. Pat. No. 5,336,329 (Langenmayr) discloses a process for decontaminating a surface contaminated with a toxic agent in which the surface is contacted with a sorbent selected form the class consisting of a carbonaceous resin containing hydroxide of sodium, potassium or lithium within its pores, a macrotecular ion exchange resin which has a strong base hydroxide functionality and water in its pores, and a macronet resin which has been impregnated with a Lewis acid.

U.S. Pat. No. 5,354,478 (Ulman et al) discloses an aqueous solution of sodium borohydride, sodium hydroxide, and an anionic polymer being useful for the reduction and separation of metals in wastewater, and which may also contain an alkali metal aluminate.

"Ion Exchange Resins as Catalysts in the Decomposition of Sarin," Chasanov, et al., *Journal of Polymer Science*, Volume XXXI, pages 399–414, (1958) discloses that Sarin may be hydrolyzed by using ion exchange resins to catalyze the decomposition of the Sarin (phosphonofluoridate), and the kinetics of hydrolysis of Sarin in dilute aqueous solution with various ion exchange resins, and the influence of resin particle size, solution temperature, and stirring speed of the solution on the rate of reaction.

For the foregoing reasons, there is a need for a treatment process that may be used in cartridge, pipeline, and batch, that can handle a large variety of sulfur bearing environmental pollutants, is faster than other methods, and that does not leave dangerous degradation product fractions and residuals in wastewater from the treatment process itself. Such treatment process should be capable of using a safe, dry storable cartridge with small amounts of dry storable mixed resins in a small cartridge, that can fit into a "point of use" pipeline from a contaminated well or point of contaminated "run-off". Dangerous degradation product fractions and residuals in wastewater should be minimized, in order to minimize residual environmental impacts from the treatment process itself.

SUMMARY

The present invention is directed to a process for capture, degradation, and destruction of a sulfur bearing compound that satisfies the needs for a treatment process that may be used in cartridge, pipeline, and batch, that can handle a large variety of sulfur bearing environmental pollutants, is faster than other methods, and that does not leave dangerous degradation product fractions and residuals in wastewater from the treatment process itself. The present invention is further directed towards a treatment process that is capable of using a safe, dry storable cartridge with small amounts of dry storable mixed resins in a small cartridge, that can fit into a "point of use" pipeline from a contaminated well or point of contaminated "run-off". Dangerous degradation product fractions and residuals in wastewater, are minimized, in order to minimize residual environmental impacts from the treatment process itself.

Sulfur bearing compounds are mixed with metals insoluble with the sulfur bearing compounds, reducing agents, and bases. The sulfur bearing compounds to be captured, degraded, and destroyed are reacted with the mixture of metals insoluble with the sulfur bearing compounds, reducing agents, and bases. Fractions are chemically bonded to the mixture, which may be in resin form, utilizing rapid precipitation of the sulfur bearing compound by the insoluble metal in a complex anionic form, in the presence of an anionic reducing agent, which encourages the formation of sulfide anions to aid in precipitation, while continuing rapid alkaline degradation with alkali anions.

A process for capture, degradation, and destruction of a sulfur bearing compound having features of the present invention comprises: contacting a sulfur bearing compound with a mixture of a metal insoluble with the sulfur bearing compound, a reducing agent, and a base; and capturing, degrading, and destroying the sulfur bearing compound in the mixture of the metal insoluble with the sulfur bearing compound, the reducing agent, and the base.

BRIEF DESCRIPTION OF THE DRAWINGS

FIG. 1 is a plot illustrating the process of the invention.

DETAILED DESCRIPTION

In the process of the present invention, metals insoluble with sulfur compounds are mixed with reducing agents and bases. Sulfur bearing compounds to be captured, degraded, and destroyed are reacted with the mixture of insoluble precipitating metals, reducing agents, and bases. Fractions are chemically bonded to resins, utilizing rapid precipitation of a polluting agent by a heavy metal in a complex anionic form, in the presence of an anionic reducing agent, which encourages the formation of sulfide anions to aid in precipitation, while continuing rapid alkaline degradation with alkali anions.

The present invention may be practiced with soft-soft metals and soft-soft reducing agents mixed with hydroxide bases in anion resin form. The present invention may also be practiced with soft-soft metals mixed with reducing agents in zerovalent form and hydroxides in anion resin form. The soft-soft metals may be in either complex anion resin form or may be in zerovalent form, and the soft-soft reducing agents may be in either anion resin form or in solution. Typical soft-soft metals in complex anion resin form that may be used in the process of the invention are Bismuth, Copper, Silver and Mercury as Halides, Xanthates, and E.D.T.A. (ethylene diamine tetra acetate) complexes, such as bismuth chloride, tetrachlorobismuthate (III), dichlorocuprate (I), dichloroargenate (I), tetrachlormercurate (II), dichlormercurate (II), and tetrachlorodimercurate (I). Typical soft-soft metals in zerovalent form that may be used in the mixture are Bismuth, Lead, Copper and Silver.

The test protocol for determining the effects of reacting a sulfur bearing compound in batch with a mixture of resins of metals insoluble with sulfur compounds, reducing agents, and bases, according to the present invention, is demonstrated, as follows:

1. Mechanically mixed combinations of semidried resins are added to glass stoppered erlenmyer flasks, according to Examples 1–29. Deionized distilled water is added to each flask, the volume of deionized distilled water being equal to the volume of sulfur bearing compound in a solvent to be added after the flasks are shaken. The flasks are maintained at 21° C+/−1° and shaken linearly at a rate of 1.5 inches per second.

2. A sulfur bearing compound in a solvent, in this case selected to be methyl parathion in methanol, respectively, are added in an amount equal to the already present volume of deionized distilled water and over the already present resins.

3. Periodically, 0.20 ml samples are withdrawn through a 45 micron filter and injected into a high performance liquid chromatograph for analysis.

4. The injected sample high performance liquid chromatograph peak heights and retention times, are compared to a time zero sample of $1.00 \times 10^{-3}$M methyl parathion in methanol diluted with an equal volume of deionized distilled water.

5. The results are given as an average of two sample rate constants, calculated from the peak height (millimeters) of the high performance liquid chromatograph at elapsed time (t) in hours (decimal) compared with the high performance liquid chromatograph peak height value (at time zero) by the following calculation:

k=ln [(peak height at time zero)/(peak height at time t)] divided by elapsed time in seconds, and is thus reported in units as $2.25 \times 10^{-5} s^{-1}$, where ln is the natural logarithm.

EXAMPLES 1–6

In Examples 1–6, 25 ml $1.00 \times 10^{-3}$M of the sulfur bearing compound in a solvent, in this case selected to be methyl parathion in methanol, respectively, are added to the 25 ml of water present over the resins in 125 ml glass stoppered erlenmyer flasks. The resulting average rate constants for various resin mixtures in Examples 1 through 6 are illustrated in Table 1, as follows:

TABLE 1

Average Rate Constants for Mixed Resins in Batch
$k_{obs}'$ ($10^{-5}s^{-1}$ at 21° C.)

| | | Time (hours) | | | | |
|---|---|---|---|---|---|---|
| Example | Test | 2 | 4 | 17 | 27 | 48 |
| 1 | 1 g OH⁻, MP | 3.62 | 3.45 | 2.24 | 2.14 | 1.06 |
|   | 2 g OH⁻, MP | 7.24 | | | | |
|   | 3 g OH⁻, MP | 10.86 | | | | |
| 2 | 1 g OH⁻, MP, 1 g $BH_4^-$, ⅛ g $BiCl_4^-$ | 30.17 | 18.71 | 4.70 | 3.21 | 1.87 |
| 3 | 1 g OH⁻, MP, 2 g $BH_4^-$, ⅛ g $BiCl_4^-$ | 41.50 | 21.40 | 4.92 | 3.15 | 1.85 |
| 4 | 1 g Cl⁻, MP, 1 g $BH_4^-$ | 4.46 | 3.52 | 1.71 | 1.39 | 1.10 |
| 5 | 1 g OH⁻, MP, eq Bi° | 1.33 | 1.16 | 1.09 | 0.865 | 0.676 |
| 6 | 1 g OH⁻, MP, 1 g $BH_4^-$, eq Bi° | 15.64 | 12.88 | 4.55 | 4.55 | 1.75 |

These rate constants indicate the more rapid time frame for methyl parathion to be captured, degraded, and destroyed as compared with the much slower time frame for hydroxide to react with methyl parathion. Substantially quicker reaction times and substantially greater rate constants are observed at two hours for the mixed resin than for hydroxide alone.

Rapid capture of methyl parathion takes place with in-situ presence of the $BiCl_4^-$ resin and in-situ presence of the $BH_4^-$. Examples 2 and 3 illustrate the rate constants of the present invention with a resin mix of $BH_4^-$, $BiCl_4^-$, and OH⁻, which indicate a rapid decrease of methyl parathion concentration, as compared with the control of OH⁻ loaded resin hydrolysis in Example 1. High rates for the $BH_4^-$, $BiCl_4^-$, and OH⁻ resin mix are particularly evident at two hours. Capture of methyl parathion is shown to be several times faster with the $BH_4^-$, $BiCl_4^-$, and OH⁻ resin mix as compared with the same amount of hydroxide resin.

Rapid in-situ capture of methyl parathion is demonstrated by the increased rate at two hours for two grams of $BH_4^-$, as compared with 1 gram of $BH_4^-$, in Examples 3 and 2, respectively, and with the same amount of $BiCl_4^-$ present in each example. In-situ $BiCl_4^-$ is twice as effective as bismuth metal. Example 6 show the effects of replacement of the in-situ $BiCl_4^-$ with powdered non in-situ bismuth metal in the form of Bi°. A doubling of the rate at two hours is shown when one gram of $BH_4^-$ is added to in-situ $BiCl_4^-$ resin compared with non in-situ Bi° metal in Examples 2 and 6, respectively.

Example 4 illustrates the rate constant when OH⁻ is replaced with Cl⁻ and shows a decreased rate of capture at two hours, less than that for the equivalent amount of alkali in Example 1. Examples 5 and 6 show resulting rate constants for non in-situ Bi° powdered metal with OH⁻ alone and with OH⁻ and in-situ $BH_4^-$, respectively. Even with non in-situ Bi° metal, addition of in-situ $BH_4^-$ produces an increase in rate. Example 5 shows that the effect of eliminating the $BH_4^-$ results in a much lower rate constant.

It is apparent from Example 1-6 that capture of methyl parathion takes place early in the process of the invention, and alkaline hydrolysis prevails during the latter part of the process. This is apparent, as can be seen by the higher rate constants for the resin mix at the early part of the process and the lower rate constants, approaching those for hydroxide during the latter part of the process. The rates at forty eight hours, when alkaline hydroxide is the prevailing process, are in proportion to the number of moles of sodium hydroxide present, considering the hydrolysis of a mole of sodium borohydride to give a mole of sodium hydroxide. Loaded borohydride in situ with bismuth chloride, thus, reacts quicker with the methyl parathion in solvent than hydroxide alone.

It is obvious from Examples 2 and 3 that increasing the concentration of borohydride increases the rate of the process of the invention. It is also seen that bismuth chloride is more effective than powdered metal bismuth, when comparing the higher rate constants at the early part of the process for Examples 2 and 3 with Example 6.

EXAMPLES 7-8

Examples 7 and 8 are run in 25 ml glass stoppered erlenmeyer flasks. 5 ml of $1\times10^{-3}$ molar methyl parathion in methanol, is introduced into 5 ml of deionized distilled water over combinations of 0.25 g of OH⁻ resin, 0.125 g $BH_4^-$ resin or the equivalent $BH_4^-$ solution, and 0.125 g of $BiCl_4^-$ resin at 21° C. Examples 7 and 8 are shown in Table 2.

TABLE 2

Average Rate Constants for Mixed Resins in Batch
$k_{obs}'$ ($10^{-5}s^{-1}$ at 21° C.) at 3 hours

| Example | Test | Time (hours) 3 |
|---|---|---|
| 7 | 0.25 g OH⁻, 0.125 g $BiCl_4^-$, 0.125 g $BH_4$ resin | 2.44 |
| 8 | 0.25 g OH⁻, 0.125 g $BiCl_4^-$, eq. ($BH_4$) solution | 2.39 |

Examples 7 and 8 show that in-situ resin $BH_4^-$ is equal to or slightly more effective than $BH_4^-$ in solution, thus demonstrating long term storability of the $BH_4^-$ resin under damp or moist conditions, without loss of effectiveness. As a further test, the $BiCl_4^-$ resin was placed in water for a number of months, with no indication of reaction, thereby showing long term shelf storability of the $BiCl_4^-$ resin.

EXAMPLES 9-12

Examples 9-12 are run in 50 ml glass stoppered erlenmeyer flasks with OH⁻ resin and/or $BH_4^-$, $BiCl_4^-$ resins under 10 aqueous ml and 10 ml of $0.973\times10^{-3}$M methyl parathion in 28% methanol/72% 2-propanol at 21° C. added. Examples 9-12 are illustrated in Table 3. Examples 9 and 10 show no increase in rate with a double loading of the $BiCl_4^-$ resin in a mixture of the $BiCl_4^-$, $BH_4^-$ and OH⁻ resins.

TABLE 3

$k_{obs}'$ ($10^{-5}s^{-1}$ at 21° C.)
In acid conditions.
Averages of two flasks.

| Example | Test | Time (hours) | | |
|---|---|---|---|---|
| | | 22 | 53 | 74 |
| 9 | ½ OH⁻, MP ¼ BH₄⁻, ¼ BiCl₄⁻ | 17.1 | 7.89 | 6.14 |
| 10 | ½ OH⁻, MP ¼ BH₄⁻, ½ BiCl₄⁻ | 17.4 | 8.74 | 6.07 |
| 11 | ½ OH⁻, MP ¼ BH₄⁻ | 10.8 | 8.30 | 6.63 |
| 12 | ½ OH⁻, MP ¼ BiCl₄⁻ | 1.48 | 0.98 | 0.96 |

Examples 9–12 illustrate that increasing the amount of $BiCl_4^-$ resin in the process of the invention does not significantly increase the rate of reaction. This indicates that pure precipitation alone is not the main process of the invention. The main process of the invention is in situ reduction in combination with in situ precipitation by reactive ion exchange. The early capture and reductive precipitation effect, and that pure precipitation alone is not the main part of the process, is indicated by much higher rates of reaction at 22 hours for the resin mixture of $OH^-$, $BH_4^-$, and $BiCl_4^-$, shown in Examples 9 and 10, than the sum of separate reduction and precipitation effects for $OH^-$ with $BH_4^-$ and $OH^-$ with $BiCl_4^-$, shown in Examples 11 and 12, respectively.

EXAMPLES 13–15

Examples 13–15 are run in 125 ml glass stoppered erlenmeyer flasks, and are shown in Table 4. 25 ml of $1.00 \times 10^{-3}$ molar methyl parathion are added to 2 g of $BH_4^-$ and 0.125 g of $BiCl_4^-$, with 1 g of $OH^-$ present in Examples 13, 1 g of $Cl^-$ resin present in Example 14, and 3 g of $OH^-$ in Example 15, in 25 ml of deionized distilled water.

TABLE 4

| Example | Test | Time (hours) | | |
|---|---|---|---|---|
| | | 0.75 | 27.4 | 34.3 |
| 13 | 1 g OH⁻, 2 g BH₄⁻, 0.125 g BiCl₄⁻ | 60.3 | 3.257 | 2.638 |
| 14 | 1 g Cl⁻, 2 g BH₄⁻, 0.125 g BiCl₄⁻ | 90.48 | 3.049 | 2.439 |
| 15 | 3 g OH⁻ | 36.63 | 10.422 | 10.227 |

Unique early capture and reductive precipitation effect is further demonstrated by the fifty percent greater rate of reaction for the $BH_4^-$ resin in concert with the $BiCl_4^-$ resin and $Cl^-$ in Example 14 compared to the $BH_4^-$ resin with the $BiCl_4^-$ resin and $OH^-$ in Example 13 at 0.75 hours. The unique early capture and reductive precipitation results from the more inert $Cl^-$ in Example 14 replacing $OH^-$ and its associated alkaline hydrolysis in Example 13. Examples 13 and 14 show the influence of the $BH_4^-$ resin acting in concert with the $BiCl_4^-$ resin compared to alkaline hydrolysis alone in Example 15, and the substantially lower rate of reaction of 36.63 at 0.75 hours.

EXAMPLES 16–23

Examples 16–23 are run in 125 ml glass stoppered erlenmeyer flasks. 25 ml of $1.00 \times 10^{-3}$ molar (25 micromoles) methyl parathion are added to 2 g of $BH_4^-$ and 0.125 g of $BiCl_4^-$, with $OH^-$ present in Examples 16, 17, 20, and 21 and $Cl^-$ resin present in Examples 18, 19, 22, and 23 in 25 ml of deionized distilled water. This results in a rapid reaction in which a gray black resin precipitate appears under an off white resin precipitate, the off white resin precipitate appearing under a pale yellow supernatant. The pale yellow supernatant is then decanted from the off white resin precipitate, and then the off white resin is rinsed with small portions of half methanol half deionized distilled water, the rinses being combined with the supernate. The heavier gray black resin precipitate is then separated from the lighter off-white resin precipitate by centrifugation in 10 ml test tubes. Each resulting precipitate fraction is stirred and extracted with half methanol half concentrated HCl solvents.

In Examples 16–19, illustrated in Table 5, the methyl parathion and its recovered breakdown product nitrophenol present in the supernate are released into portions of the HCl/methanol resin extracts and are read by simultaneous spectrophotometry against standards at 215 nm and 410 nm wavelengths, respectively, after adjustment to pH 7.86 to develop the lemon yellow nitrophenolate color. In Examples 20–23, the $BiCl_4^-$ in the HCl/methanol resin extract is compared to $BiCl_4^-$, HCl/methanol standards and its concentration being determined spectrophotometrically at 319.5 nm.

Unique early capture and reductive precipitation of methyl parathion is further shown and confirmed in Examples 16–19. Examples 16 and 17 show results for 1 g $OH^-$, 2 g $BH_4^-$, 0.125 g $BiCl_4^-$, and Examples 18 and 19 show results for 1 g $Cl^-$, 2 g $BH_4^-$, 0.125 g $BiCl_4^-$. These results indicate early reductive precipitation and later alkaline hydrolysis, in the gray black precipitate.

The average percentage of methyl parathion and its breakdown product nitrophenol recovered is 66.8% for all phases in the batch process, while the average percentage of methyl parathion recovered with respect to the breakdown products of nitrophenol recovered is 74.1% in the resin phases. The 74.1% of the methyl parathion recovered is from the gray-black precipitate and shows where rapid capture occurs. This corresponds with visual observations that there is no lemon yellow nitrophenol hydrolysis products in either the unprecipitated white resin or in the precipitated gray black bismuth resin combination, but does show a small amount of lemon yellow nitrophenol hydrolysis products in the supernate. These results reveal that little $OH^-$ degradation with its resultant yellow nitrophenolate takes place during rapid formation of the gray black precipitate.

TABLE 5

Mass Balance of Methyl Parathion
and Nitrophenol
($10^{-6}$ moles)
(by Simultaneous Equations)

| Example | Test | MP or NP* | Supernatant Solution | Gray Black Resin | White Resin | Recovered | Total Recovered ** | Per Cent MP Recovered |
|---|---|---|---|---|---|---|---|---|
| 16 | 1 g OH$^-$, 2 g BH$_4^-$, 0.125 gBiCl$_4^-$ | MP | | 9.045 | 3.553 | 12.61 | | 71.7 |
|  |  | NP | 1.558 | | | 1.56 | | 56.68 |
|  |  |  |  |  |  |  | 14.17 |  |
| 17 | 1 g OH$^-$, 2 g BH$_4^-$, 0.125 g BiCl$_4^-$ | MP | | 11.21 | 3.923 | 15.13 | | 74.1 |
|  |  | NP | 1.58 | | | 1.58 | | 66.84 |
|  |  |  |  |  |  |  | 16.71 |  |
| 18 | 1 g Cl$^-$, 2 g BH$_4^-$, 0.125 g BiCl$_4^-$ | MP | | 11.99 | 4.454 | 16.44 | | 72.9 |
|  |  | NP | 0.168 | | | 0.168 | | 66.44 |
|  |  |  |  |  |  |  | 16.61 |  |
| 19 | 1 g Cl$^-$, 2 g BH$_4^-$, 0.125 g BiCl$_4^-$ | MP | | 13.68 | 4.014 | 17.70 | | 77.3 |
|  |  | NP | 1.60 | | | 1.60 | | 77.20 |
|  |  |  |  |  |  |  | 19.30 |  |

*Methyl Parathion or its breakdown product recovered (Nitrophenol)
**Total Recovered from 25 micromoles of Methyl Parathion input
***Per Cent of Methyl Parathion Recovered in the gray black precipitate Examples 19–23 are shown in Table 6. Examples 19–23 show that of the small amount of Bismuth recovered, an average of 84% is captured and recovered primarily from the gray-black-resin combination, the remainder being strongly bonded to the off white resin, for continued capture. Examples 20 and 21 show results for 1 g OH$^-$, 2 g BH$_4^-$, 0.125 g BiCl$_4^-$, and Examples 22 and 23 show results for 1 g Cl$^-$, 2 g BH$_4^-$, 0.125 g BiCl$_4^-$.

g BiCl$_4^-$ under 25 ml of 17.9 megaohm deionized distilled water. One resin sample was prepared for each of the aforementioned sulfur bearing analogs. Examples 24–27 are illustrated in Table 7.

Rapid early capture of the methyl parathion and the methyl parathion sulfur bearing analogs fenitrothion,

TABLE 6

Recovery of BiCl$_4^-$ (Acid Fractions)
($10^{-6}$ moles)

| Example | Test | Supernatant Solution | Gray Black Resin | White Resin | Total Recovered | Per Cent Recovered |
|---|---|---|---|---|---|---|
| 20 | 1 g OH$^-$, 2 g BH$_4^-$, 0.125 g BiCl$_4^-$ | 0.724 | | | | 12.40 |
|  |  |  | 4.838 | | | 82.87 |
|  |  |  |  | 0.276 | | 4.72 |
|  |  |  |  |  | 5.838 | |
| 21 | 1 g OH$^-$, 2 g BH$_4^-$, 0.125 g BiCl$_4^-$ | 0.473 | | | | 3.58 |
|  |  |  | 12.31 | | | 93.12 |
|  |  |  |  | 0.436 | | 3.30 |
|  |  |  |  |  | 13.220 | |
| 22 | 1 g Cl$^-$, 2 g BH$_4^-$, 0.125 g BiCl$_4^-$ | 2.00 | | | | 14.81 |
|  |  |  | 10.92 | | | 81.09 |
|  |  |  |  | 0.55 | | 4.11 |
|  |  |  |  |  | 13.470 | |
| 23 | 1 g Cl$^-$, 2g BH$_4^-$, 0.125 g BiCl$_4^-$ | 1.365 | | | | 17.08 |
|  |  |  | 6.333 | | | 79.53 |
|  |  |  |  | 0.265 | | 3.33 |
|  |  |  |  |  | 7.963 | |

EXAMPLES 24–27

In Examples 24–27, 25 ml of $1.00 \times 10^{-3}$M of methyl parathion and each of the methyl parathion sulfur bearing analogs fenitrothion, fensulfothion, and fenthion on resins is added to a resin mix of 0.25 g OH$^-$, 0.50 g BH$_4^-$, and 0.125 fensulfothion, and fenthion on resins is shown by the reaction rate constants ($k_{obs}$ in units of $10^{-5}s^{-1}$) in Examples 24–27. In each of Examples 24–27, the rate of capture on the resin mix is much faster than that of the generally accepted "standard" rate of OH$^-$ hydrolysis at two hours, except Fenitrothion.

TABLE 7

Rate Constants for Mixed Resins and OH⁻ in Batch
$k_{obs}'$ ($10^{-5} s^{-1}$ at 21° C.)

| | | Mix Times (Hours) | | | OH⁻ Time (Hours) | | |
|---|---|---|---|---|---|---|---|
| Example | Test | 2 | 25 | 50 | 2 | 25 | 50 |
| 24 | Methyl Parathion | 17.28 | 4.299 | 9.412 | 5.122 | 2.603 | 2.059 |
| 25 | Fensulfothion | 0.906 | 0.322 | 0.097 | 0.260 | 0.256 | 0.195 |
| 26 | Fenitrothion | 2.178 | 0.402 | 0.267 | 2.260 | 0.915 | 0.647 |
| 27 | Fenthion | 14.00 | 3.724 | 2.802 | 8.183 | 2.904 | 2.212 |

EXAMPLES 28–29

In Examples 28 and 29, a 0.875 g total resin mix of 0.25 g OH⁻ resin, 0.50 g $BH_4^-$ resin, and 0.125 g $BiCl_4^-$ resin is prepared with 25 L of $0.992 \times 10^{-3}$M (approximately 25 micromoles) of hemi-mustard in methanol diluted and added to 25 ml of DeDw over resin to give a $5 \times 10^{-4}$M solution. In Example 29, 0.875 g of standard OH⁻ resin is also treated as in Example 28, but with the resin mix replaced by the standard OH⁻. For both examples, the change in HPLC peak height of sulfide is determined. One sample is prepared for each determination.

Capture of the sulfur bearing stimulant 2-chloroethyl ethyl sulfide, called hemi-mustard, is shown by examples 28 and 29 and is illustrated in Table 8. In these examples, the faster precipitation of mixed resin over OH⁻ resin continues to later times.

TABLE 8

Rate Constants for Mixed Resins and OH⁻ in Batch
$k_{obs}'$ ($10^{-5} s^{-1}$ at 21° C.)

| | | Mix Times (Hours) | | OH⁻ Time (Hours) | |
|---|---|---|---|---|---|
| Example | Test | 3 | 50 | 3 | 50 |
| 28 | Resin Mix | 2.37 | 0.30 | | |
| 29 | OH⁻ | | | 2.28 | 0.12 |

EXAMPLE 30

The process of the invention is further shown by reacting a sulfur bearing compound with a mixture of resins of metals insoluble with sulfur compounds, reducing agents, and bases in a column. Efficient operation is demonstrated by removal of 73% of the sulfur bearing compound passed through the column in an aqueous stream, at shutdown. The sulfur bearing compound, methyl parathion in Example 30, is removed by capture, reductive precipitation, alkaline hydrolysis, and physical sorption. In the case of Example 30, the weight of the methyl parathion is 4.5 times the weight of the resin at shutdown, and thus the quantity of methyl parathion sorbed is 4.5 times greater by weight than the weight of the resin present, at shutdown.

The test protocol for determining the effects of reacting a sulfur bearing compound in a column with a mixture of resins of metals insoluble with sulfur compounds, reducing agents, and bases, according to the present invention, is demonstrated, as follows:

1. Methyl parathion is passed through a column comprising a glass tube containing mixed resin having bed dimensions of 0.30 cm inside diameter by 6.50 cm high. The column thus has a volume of 0.4596 ml and holds 0.1094 g of resin mix, which comprises one eighth of the ratio of 0.25 g OH⁻ resin, 0.50 g $BH_4^-$ resin, and 0.125 g $BiCl_4^-$ resin. Aqueous methyl parathion ($2 \times 10^{-4}$ molar in 4% methanol) is pumped through the column by a trailing sigma pump at the rate of 125 ml per day.

2. HPLC peak heights are determined for each 125 ml of effluent, and the percentage of methyl parathion passed through the column is calculated by comparing HPLC peak heights for each standard 500 ml applied to the top of the column. Daily percentages of HPLC peak data are plotted against time of passage. A least squares fit equation is plotted from the percentages of methyl parathion in the effluent against the volume passed.

The column removes $18.7 \times 10^{-4}$ moles of the $25.6 \times 10^{-4}$ moles of methyl parathion passed through the column as 12.8 liters of $2 \times 10^{-4}$ molar aqueous methyl parathion. in 4% methanol. 73% of the methyl parathion is removed, at shutdown, after passage through the column; 4.5 times methyl parathion is removed by weight as the weight of resin present. The column also removes 4.1 times as many moles of methyl parathion as moles of reactive sites present.

The column is also observed to be far from exhaustion as indicated by: the percentage of methyl parathion effluent HPLC peaks are 40% of the height of entering HPLC peaks; nitrophenol peaks leaving the column are only 1.5% of the amount represented by entering methyl parathion peaks; the amount of effluent precipitating silver cation is only 0.25% of the entering methyl parathion and gives no black sulfide turbidity; and unused cream colored ($BiCl_4^-$ and $BH_4^-$) resin mix lay at the bottom of the column. During the first 95% of this process, no degradation products of methyl parathion, namely the thiophosphate and the phenolate fractions of the hydrolysis, are detected in the effluent as these fractions remain behind on the anion exchange resin as such fractions do in the batch process.

FIG. 1, which is a plot of per cent sorption and per cent passage of methyl parathion as a function of the amount of methyl parathion passed through the column, further illustrates the process of the invention. As can be seen from the plot, sorption is: 84 percent at the beginning of the process, 62 per cent at shutdown, and 42 per cent at the mid point between start of the process and shutdown. A total of $96.4 \times 10^{-4}$ moles of methyl parathion is sorbed by the time the column is exhausted. 1.0215 grams of methyl parathion is thus sorbed by the time the column is exhausted, with a total of 0.1094 grams of resin present in the column. The weight of the methyl parathion passed through the resin is thus 9.3 times the weight of the resin.

Although the present invention has been described in considerable detail with reference to certain preferred versions thereof, other versions are possible. Therefore, the spirit and scope of the appended claims should not be limited to the description of the preferred versions contained herein.

What is claimed is:

1. A process for capture, degradation, and destruction of a sulfur bearing compound, comprising:

contacting said sulfur bearing compound with a mixture of
    a metal insoluble with said sulfur bearing compound,
    a reducing agent, and
    a base; and
  capturing, degrading, and destroying said sulfur bearing compound in said mixture of
    said metal insoluble with said sulfur bearing compound, said reducing agent,
and said base.

2. The process for capture, degradation, and destruction of a sulfur bearing compound according to claim 1, wherein said metal insoluble with said sulfur bearing compound is in complex anion resin form.

3. The process for capture, degradation, and destruction of a sulfur bearing compound according to claim 2, wherein said metal insoluble with said sulfur bearing compound in complex anion resin form is selected from the group consisting of bismuth, copper, silver, and mercury as halide, xanthate, and ethylene diamine tetra acetate complexes.

4. The process for capture, degradation, and destruction of a sulfur bearing compound according to claim 3, wherein said metal insoluble with said sulfur bearing compound in complex anion resin form is selected from the group consisting of bismuth chloride, tetrachlorobismuthate (III), dichlorocuprate (I), dichloroargentate (I), tetrachlormercurate (II), dichlormercurate (I), and tetrachlorodimercurate (I).

5. The process for capture, degradation, and destruction of a sulfur bearing compound according to claim 1, wherein said metal insoluble with said sulfur bearing compound is in zerovalent form.

6. The process for capture, degradation, and destruction of a sulfur bearing compound according to claim 5, wherein said metal insoluble with said sulfur bearing compound in zerovalent form is selected from the group consisting of bismuth, lead, copper, and silver.

7. The process for capture, degradation, and destruction of a sulfur bearing compound according to claim 1, wherein said reducing agent is in anion resin form.

8. The process for capture, degradation, and destruction of a sulfur bearing compound according to claim 7, wherein said reducing agent in anion resin form is a hydride ion.

9. The process for capture, degradation, and destruction of a sulfur bearing compound according to claim 7, wherein said reducing agent in anion resin form is borohydride.

10. The process for capture, degradation, and destruction of a sulfur bearing compound according to claim 1, wherein said reducing agent is in solution.

11. The process for capture, degradation, and destruction of a sulfur bearing compound according to claim 10, wherein said reducing agent in solution is borohydride.

12. The process for capture, degradation, and destruction of a sulfur bearing compound according to claim 1, wherein said reducing agent is in zerovalent form.

13. The process for capture, degradation, and destruction of a sulfur bearing compound according to claim 12, wherein said reducing agent in zerovalent form is selected from the group consisting of zinc, aluminum, and iron.

14. The process for capture, degradation, and destruction of a sulfur bearing compound according to claim 1, wherein said base is a hydroxide in anion resin form.

15. The process for capture, degradation, and destruction of a sulfur bearing compound according to claim 1, wherein said sulfur bearing compound is selected from the group consisting of methyl parathion, fenitrothion, fensulfothion, fenthion, and hemi-mustard.

16. The process for capture, degradation, and destruction of a sulfur bearing compound according to claim 1, wherein said sulfur bearing compound is contacted with said mixture of said metal insoluble with said sulfur bearing compound, said reducing agent, and said base in a column.

17. The process for capture, degradation, and destruction of a sulfur bearing compound according to claim 1, wherein said sulfur bearing compound is contacted with said mixture of said metal insoluble with said sulfur bearing compound, said reducing agent, and said base in a cartridge.

18. The process for capture, degradation, and destruction of a sulfur bearing compound according to claim 1, wherein said sulfur bearing compound is contacted with said mixture of said metal insoluble with said sulfur bearing compound, said reducing agent, and said base in batch.

* * * * *